Figure 1:
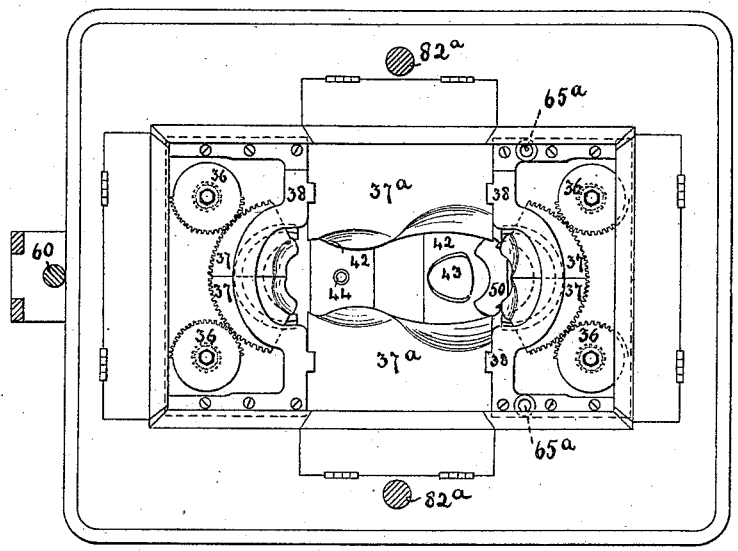

(No Model.) 8 Sheets—Sheet 1.

G. HAWKES.
LASTING MACHINE.

No. 307,763. Patented Nov. 11, 1884.

Witnesses
Lloyd B. Night
Allan McLane Abert

Inventor
Gilbert Hawkes
by Alex. P. Browne
attorney (No Model.) 8 Sheets—Sheet 2.
G. HAWKES.
LASTING MACHINE.
No. 307,763. Patented Nov. 11, 1884.
FIG. 3.
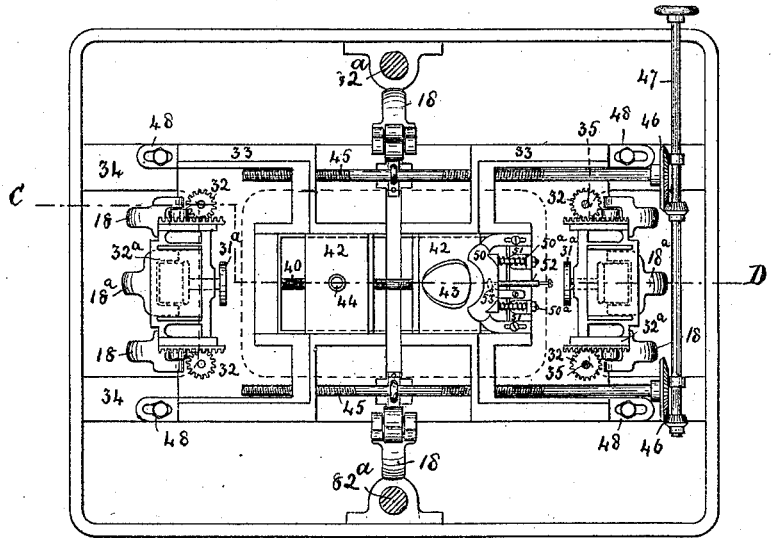
FIG. 11.
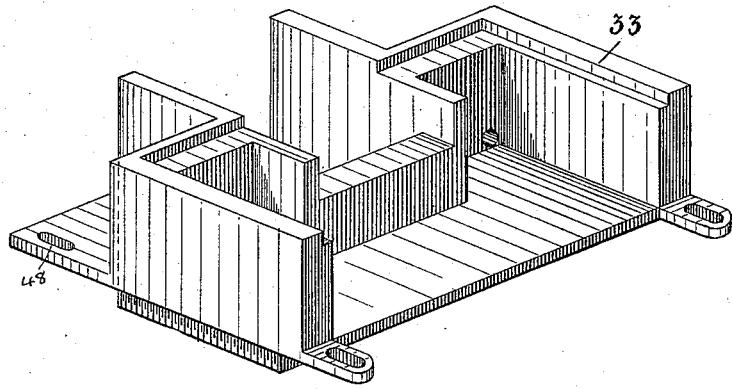
FIG. 11ª.
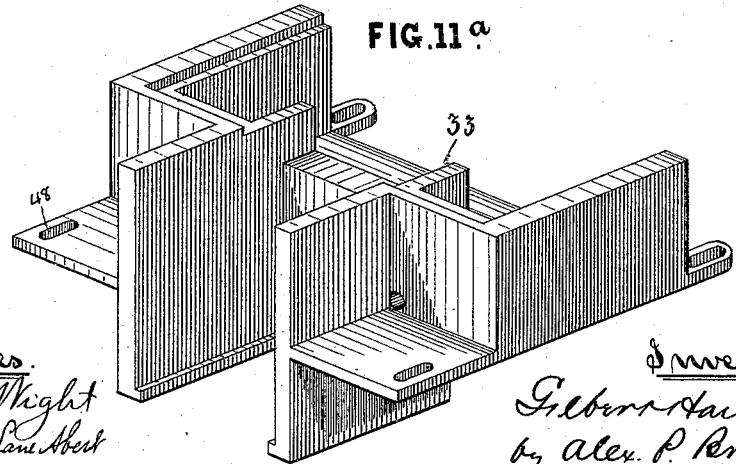
Witnesses.
Lloyd B. Wright
Allan McLane Abert
Inventor.
Gilbert Hawkes
by Alex. P. Browne,
attorney (No Model.) 8 Sheets—Sheet 3.

G. HAWKES.
LASTING MACHINE.

No. 307,763. Patented Nov. 11, 1884.

Witnesses
Lloyd B. Wight.
Allan McLane Abert.

Inventor.
Gilbert Hawkes
by Alex. P. Browne,
attorney

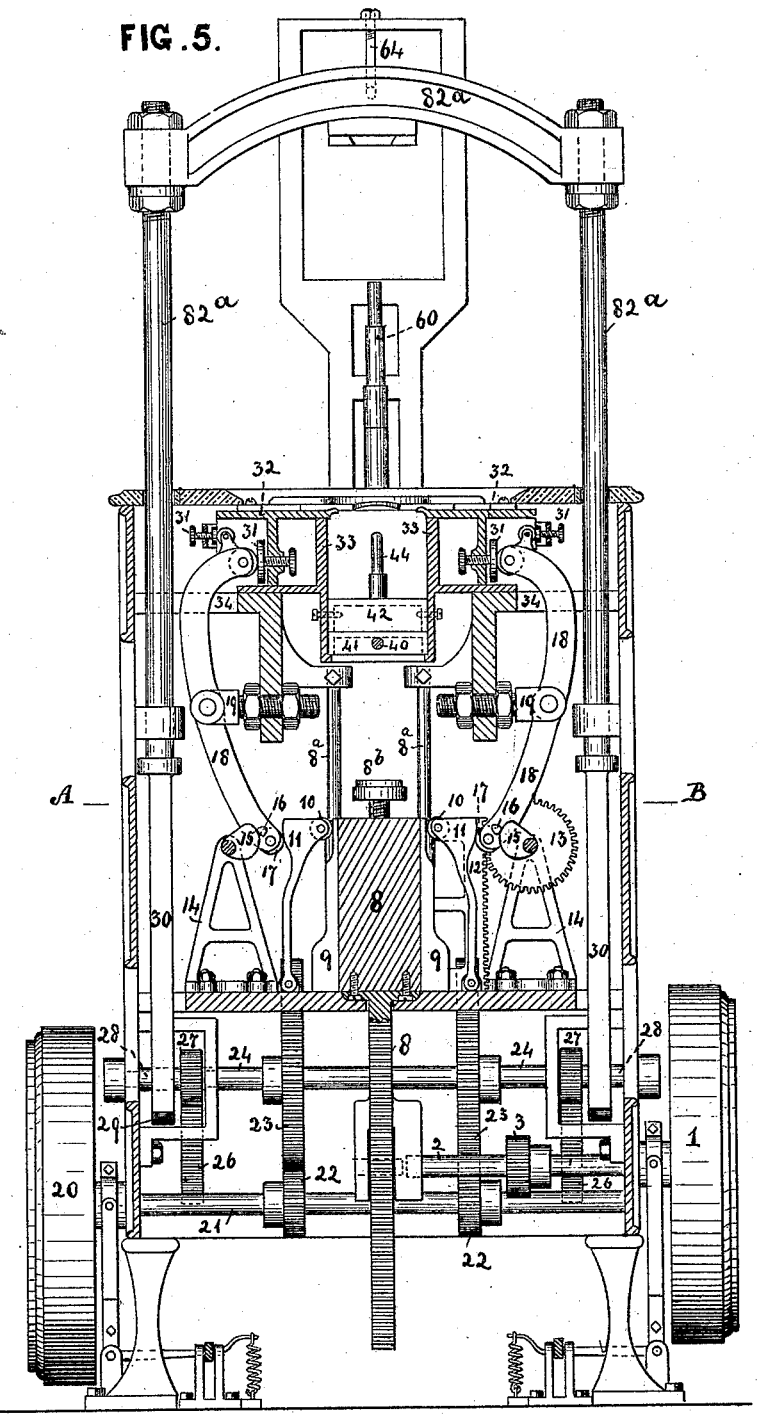

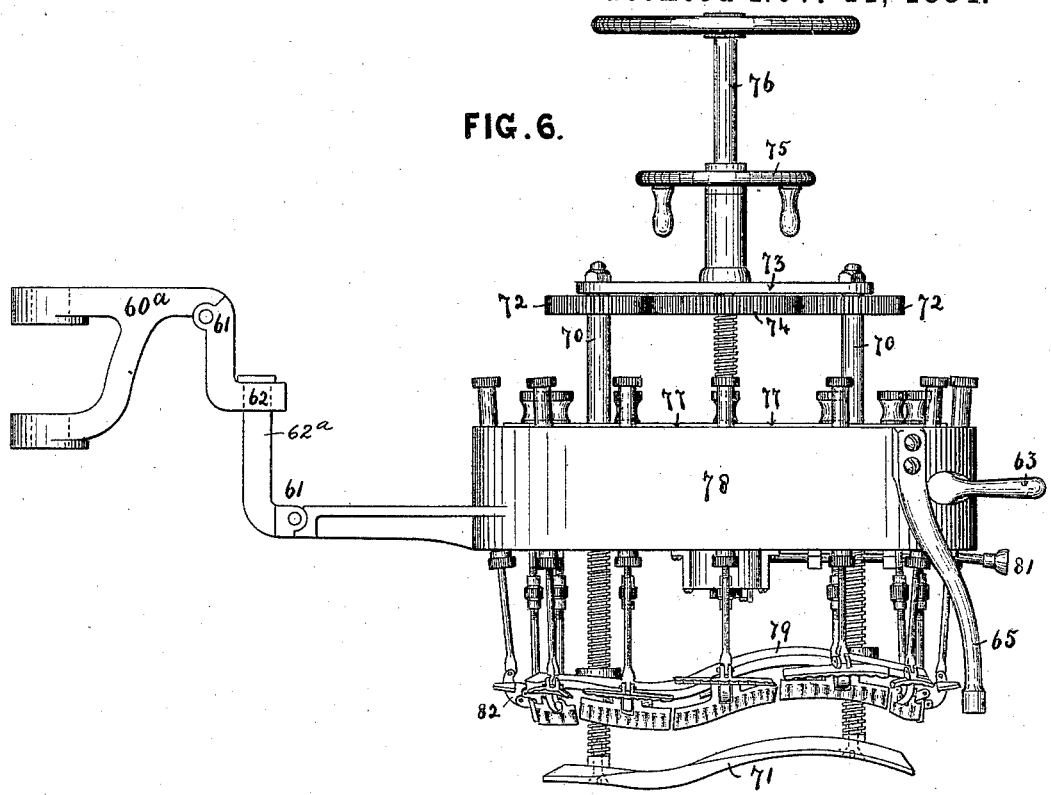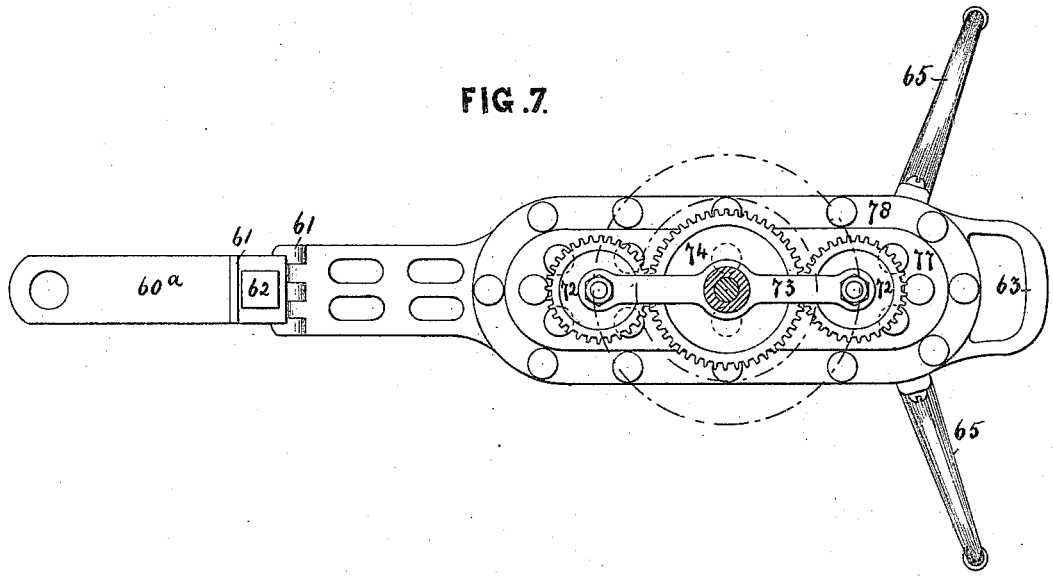

(No Model.) 8 Sheets—Sheet 6.
G. HAWKES.
LASTING MACHINE.
No. 307,763. Patented Nov. 11, 1884.
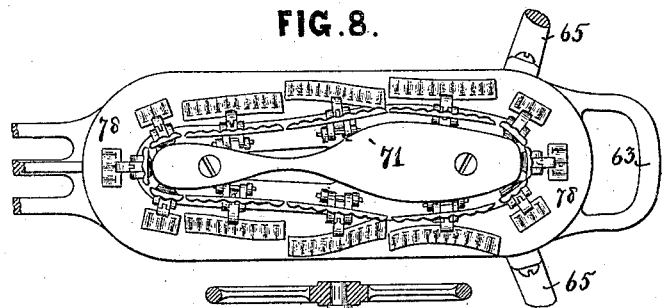
FIG. 8.
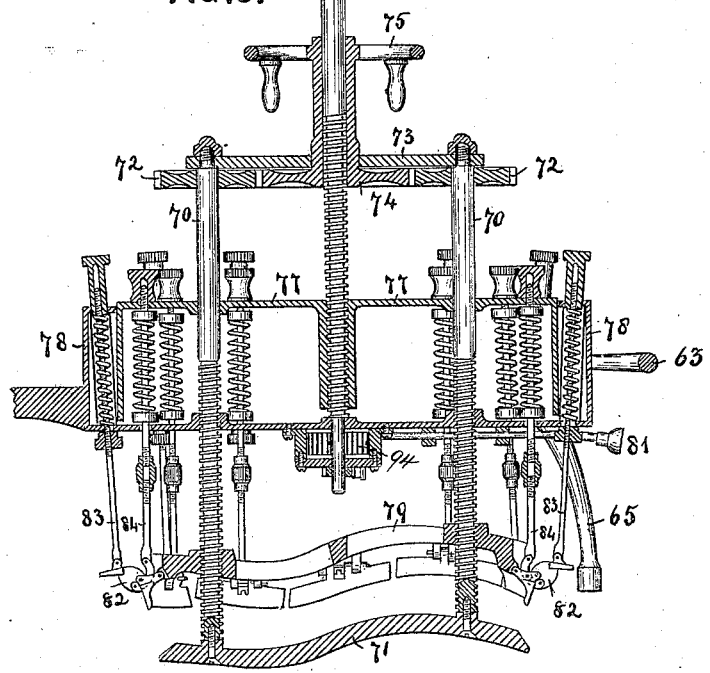
FIG. 9.
FIG. 10.
Witnesses.
Lloyd B. Wight
Allan McLane Abert
Inventor.
Gilbert Hawkes
by Alex. P. Browne
attorney
N. PETERS. Photo-Lithographer, Washington, D. C.

(No Model.) 8 Sheets—Sheet 7.

G. HAWKES.
LASTING MACHINE.

No. 307,763. Patented Nov. 11, 1884.

Witnesses
Lloyd B. Wright
Allan McLane Abert

Inventor.
Gilbert Hawkes
by Alex. P. Browne, Attorney (No Model.)
8 Sheets—Sheet 8.
G. HAWKES.
LASTING MACHINE.
No. 307,763. Patented Nov. 11, 1884.
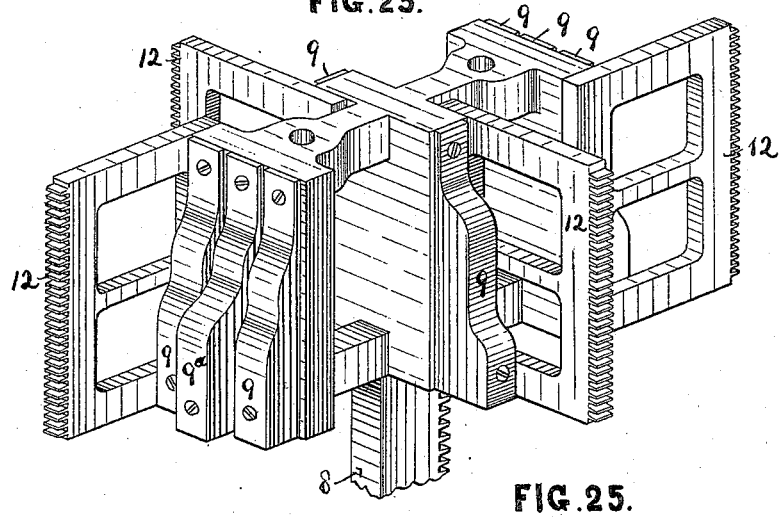
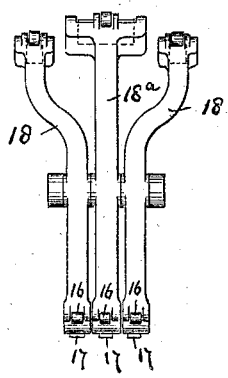
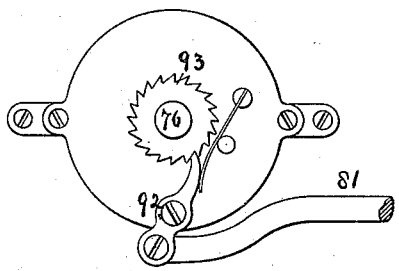
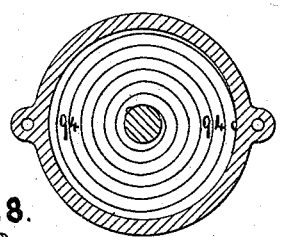
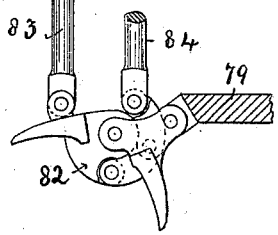
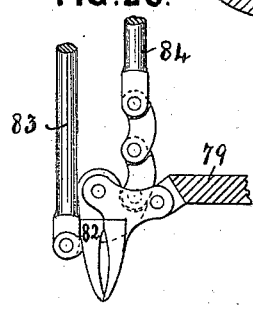
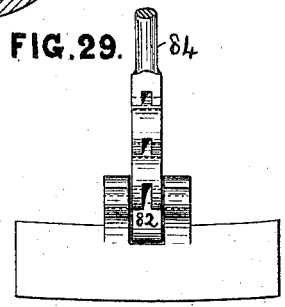
Witnesses
Lloyd B. Wight
Allan McLane Abert
Inventor.
Gilbert Hawkes
by Alex P. Browne,
attorney

UNITED STATES PATENT OFFICE.

GILBERT HAWKES, OF LYNN, MASSACHUSETTS.

LASTING-MACHINE.

SPECIFICATION forming part of Letters Patent No. 307,763, dated November 11, 1884.

Application filed December 22, 1883. (No model.)

*To all whom it may concern:*

Be it known that I, GILBERT HAWKES, of Lynn, Massachusetts, a citizen of the United States, have invented certain new and useful Improvements in Machinery for Lasting Boots and Shoes, of which the following is a specification.

The operation called "lasting" is that part of the manufacture of a boot or shoe in which the upper leather is made to assume the position and conformation upon the last and inner sole that it is to have in the finished boot or shoe, and the term "lasting" may also include the further operation of securing the upper and inner sole in such relative form and arrangement. My present invention relates to mechanisms for performing these operations, and has for its object to provide mechanical appliances and combinations whereby the performance of them may be rendered as nearly as possible automatic.

My present invention relates, first, to devices by means of which the last and upper are held in the proper position for the lasting proper, or the drawing, plaiting, or folding of the upper over and upon the last and the inner sole to be performed.

My invention also consists in improved devices and combinations thereof whereby the lasting proper is performed; and, further, in suitable devices and combinations thereof whereby the lasted upper and inner sole are secured in their relative positions; and, finally, in improved devices and combinations thereof whereby the various devices before referred to are operated, adjusted, and regulated.

I am aware that lasting-machines with heel and toe and side lasting plates, cams for operating them, overhanging pinchers, downholds, and right and left hand adjusting-screws are old, broadly, and such elements and devices are shown in various granted Letters Patent.

My present invention consists in the herein-described improvements in such devices, as particularly defined in my claims.

I will now proceed to describe a machine for lasting boots and shoes in which my invention, as above indicated, is embodied in the best form now known to me.

Figure 2:
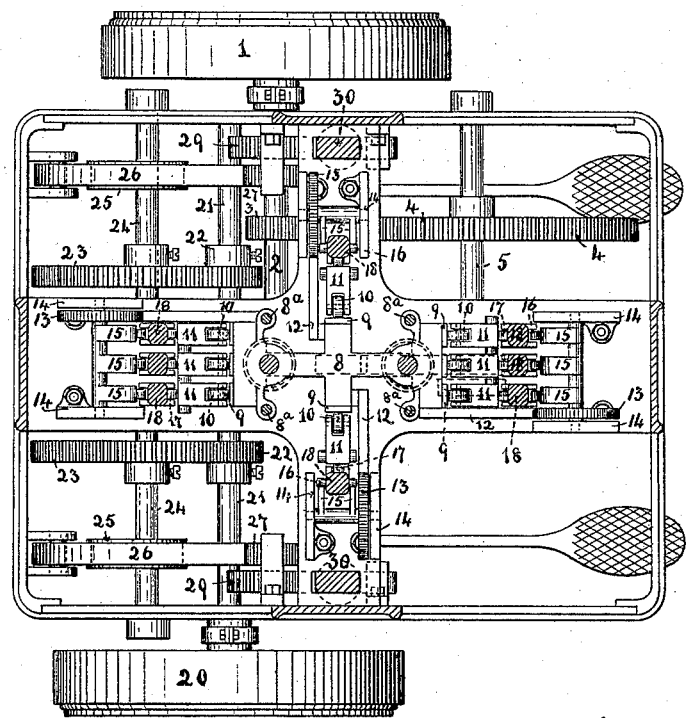
Figure 4:
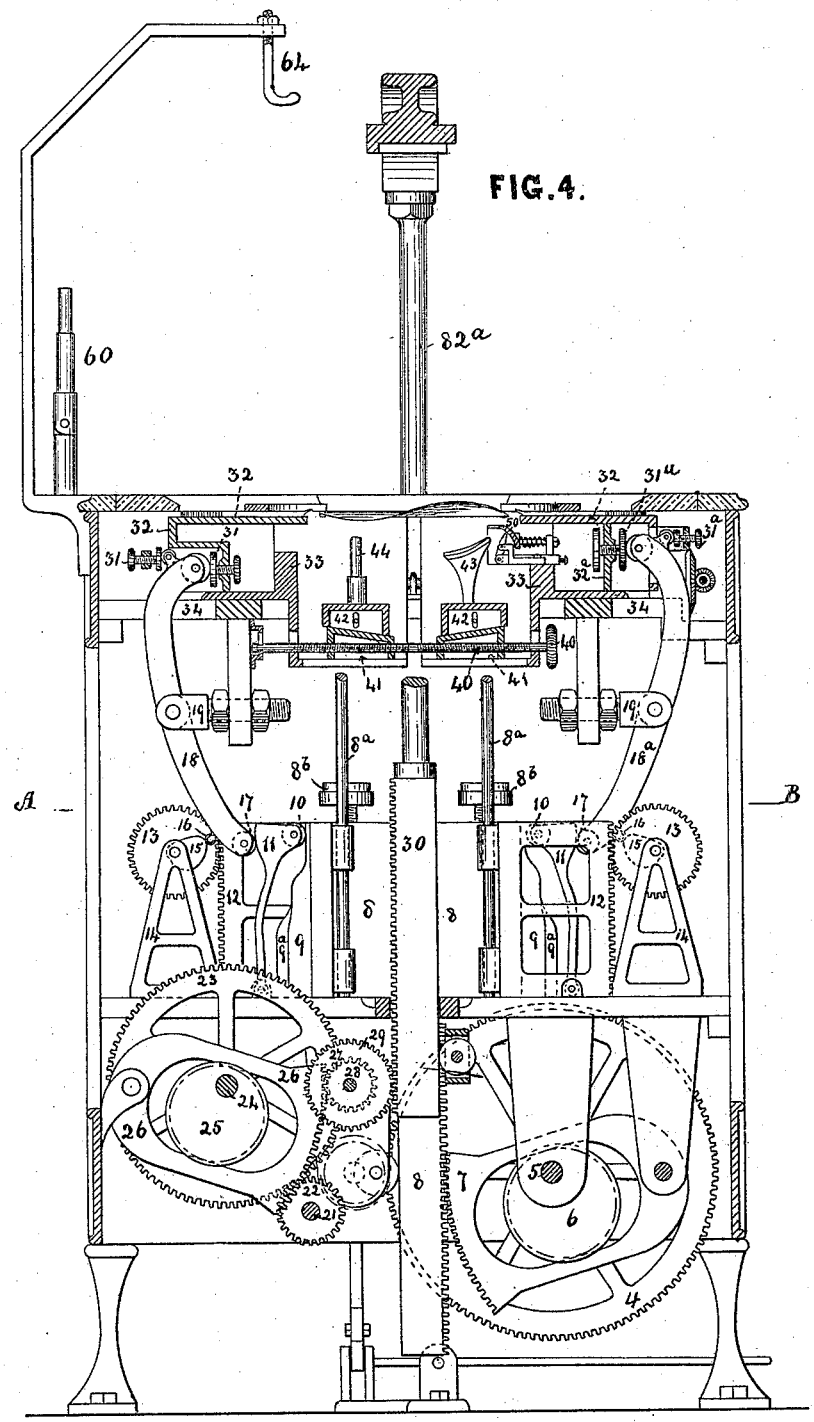
Figure 12:
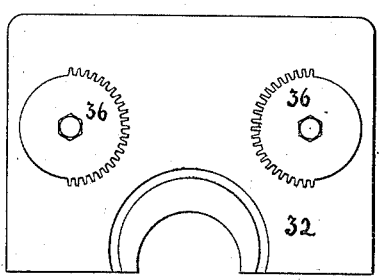
Figure 13:
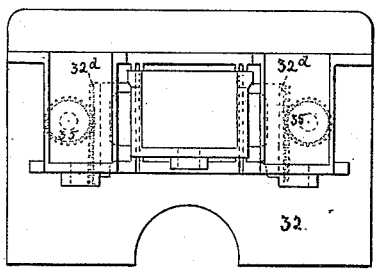
Figure 14:
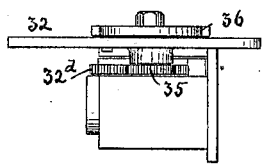
Figure 15:
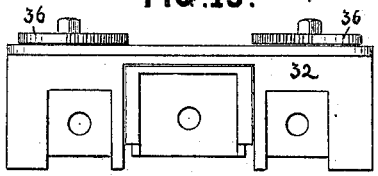
Figure 16:
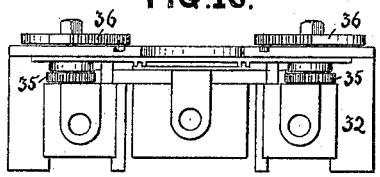
Figure 17:
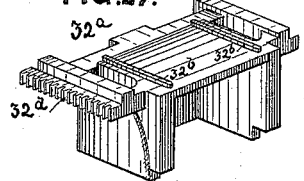
Figure 19:
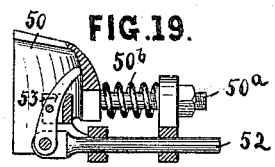
Figure 21:
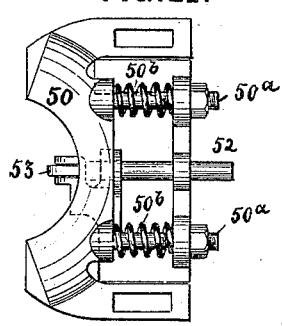
Figure 20:
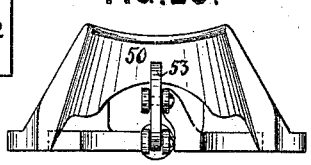
Figure 22:
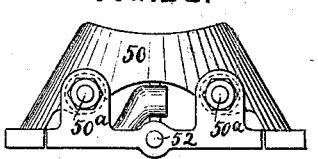

In the accompanying drawings, Figure 1 is a top plan view of the main body of the machine, omitting the gripping attachment. Fig. 2 is a plan view of the same machine, upon horizontal section through the line A B of Fig. 4. Fig. 3 is a top plan view of the same machine, the lasting sides being removed to show the interior mechanism. Fig. 4 is a vertical section of the machine on C D of Fig. 3. Fig. 5 is a vertical cross-section of the machine. Fig. 6 is a side elevation of the gripping device; Fig. 7, a top view, and Fig. 8 a bottom view, of the same. Fig. 9 is a vertical section lengthwise of the gripping device, and Fig. 10 a similar section crosswise. Figs. 11 and 11ª are perspective views, on an enlarged scale, of the well-frame. Fig. 12 is a top view of the upper box, 32. Fig. 13 is a top or plan view of the boxes with the upper portion removed to show the interior mechanism. Fig. 14 is a detailed elevation showing the gearing for operating the heel and toe lasting plates. Fig. 15 and 16 are end elevations, front and rear, of the sliding boxes which operate these plates. Fig. 17 is a perspective view of the central box, and Fig. 18 a similar view of the exterior box. Fig. 19 is a vertical section of the upper guiding device; Figs. 20 and 22, front and rear elevations, respectively, of the same, and Fig. 21 a top view of the same. Fig. 23 is a perspective view of the cam-faced carriage, and Fig. 24 is an end or rear view of the levers operating the heel and toe boxes. Fig. 25 is a detail view of the pinchers-opening device, and Fig. 26 is a sectional view showing the coiled spring in the same device. Figs. 27 and 28 are respectively side views, enlarged, of the pinchers open and closed; and Fig. 29 is an enlarged inside view of the pinchers closed.

The first operation for which the machine is employed is that of receiving and supporting the last and upper in proper position. This is done by sliding the heel end of the last over and upon a vertical pin, 44, Figs. 1, 3, 4, and 5, which enters and fits a corresponding hole at this part of the last. The toe of the last is placed upon the vertical rest 43, Figs. 1, 3, and 4. Both these parts 44 and 43 are mounted upon double-wedge blocks 41 and 42, the under block in each case being screw-threaded to receive a right and left threaded rod, 40, the turning of which causes the upper blocks to rise or fall together, other motion of these blocks being prevented by the pins and slots shown. The distance apart of the heel and toe supports is regulated by moving apart or together the sliding well-frames 33, in which the heel and toe supports are placed. As this means of adjustment is also employed for making other adjustments, it will be described later when those adjustments are considered.

The last and upper being supported as described, it is desirable that the edge of the upper, at the toe of the last, should be made to assume a certain relative vertical position, so as to be afterward engaged by the pinchers or grippers. This is accomplished by means of the adjustable guide or piece 50. (Shown in detail at Figs. 19 to 22.) This piece 50 has also the feature of being made retractible to accommodate itself to certain operations which take place later in the course of the lasting, and this feature will be explained more in detail hereinafter. The last and upper and the toe of the upper being now in position, the next operation in order is the seizing and drawing upward of the edges of the upper by means of suitable overhanging pinchers. The mechanism provided for this purpose is illustrated in Figs. 6 to 10 and Figs. 27 to 29. For convenience of manipulation, this gripping mechanism is so arranged as to be readily brought up to or away from its place of work, and I will first describe the means by which this is accomplished.

The gripping mechanism is provided with an attachment consisting of a jointed and socketed arm. (Shown in Figs. 6 and 7.) The socket in the arm is adapted to fit upon a spindle or pin or standard, 60, (shown in Figs. 4 and 5,) around which the arm carrying the gripping mechanism may be swung. By means of the joints 61 in this arm the gripping mechanism can be moved backward and upward, so as to be brought up to and suspended upon a hook, 64, or lowered down to its place of working. Furthermore, by means of the pin 62$^a$ and slot 62 the gripping mechanism can be raised or lowered vertically.

The gripping mechanism itself contains the following features: first, a plate or support adapted to rest upon the inner sole; next, a series of pinchers arranged in a curved line, substantially that of the edge of the upper, provided with means for separately regulating the amount of bite with which each pincher shall take hold, and also with mechanism permitting the regulated motion of each pincher toward or away from the central line of the last, and also with mechanism for causing the regulated upward pull of each pincher, and also with mechanism for simultaneously releasing the grip of the pinchers. For centering the gripping mechanism in its place over the last and upper, it is provided with legs 65, which enter sockets 65$^a$ in the upper side of the yoke or frame 38, as shown in Fig. 1.

I will now describe these various mechanisms in detail, pointing out the function of each in the successive operations in which the mechanism as a whole takes part.

The edge of the upper being already in the proper position, the gripping attachment is brought over and set so that the plate 71 rests upon the last and inner sole, and the legs 65 enter the sockets 65$^a$. Each pincher is then caused to seize with a regulated power the adjacent part of the edge of the upper. This is accomplished as follows: To the outer jaw, 82, Figs. 27 to 29, of each pincher are fastened two spring-rods, 83 84, one on either side of the pivot around which the jaw turns in opening and closing, the inner rod, 84, being made flexible at its lower extremity, as shown. The regulating of the amount of grip of each pincher is accomplished by means of the springs surrounding the rods and the thumb-nuts at their ends. The length of the inner spring-rods is further adjustable by making them in two parts connected with a right and left threaded sleeve, as shown. By means of these separate adjustments I am enabled to regulate the amount of grip of the pinchers individually, so that each pincher may grip the upper with such a regulated amount of force as may be required at that particular part of the upper in the operation of lasting. The inner sides of the jaws of these pinchers are corrugated or roughened, as shown, to make them take a better hold on the leather. The grip of each pincher having been properly adjusted in this way, the pinchers are simultaneously closed upon the edge of the upper by turning the screw-rod 76, which carries up the box 77 and the inner spring-rods, 84, and thereby closes the pinchers. The upward or downward motion of the outer spring-rod, 83, and the corresponding motion of the inner spring-rod, 84, attached to each pincher, may be simultaneously accomplished by reason of the fact that all the inner spring-rods are connected with the box 77, Figs. 6, 7, 9, and 10, which may be moved upward or downward by means of the screw-rod 76 and its operating-wheel, and such motion of the box 77 and the inner spring-rods, 84, produces a corresponding opposite motion of the outer spring-rods, 83. The pinchers having now all seized the upper with properly-regulated tension, the next step is to draw upward the upper simultaneously, while preserving the desired amount of tension for each pair of pinchers. This is done by causing the frame which carries all the pinchers to rise, and this motion is given to it by means of the screw-rods 70, attached to the plate 71 by screws, which are fast to the rods, but which turn freely in unthreaded apertures in the plate, and turned together by means of the wheel 75 and intervening gearing, 72 74. These same screw-rods 70 pass through screw-threaded portions of the box 78 and the frame 79. The rods turning freely upon the plate 71, it is obvious that power applied to the wheel 75 and exerted against the fulcrum furnished by the plate 71 and the last will cause the weight—that is, the frame 79 and the box 78—to rise, and thereby carry up the closed pinchers and draw up the upper all round, as described, at the same time preserving in each pincher its required individual grip or tension. The upper being thus drawn up and held, as described—that is to say, by a series of pinchers, each having a regulated grip and each capable of swinging inward toward the center of the last against a regulated resistance—the next operation is to bring the edge of the upper over and upon the last and inner sole into the form in which it is to be when the lasting is finished. This is done first at the heel and toe, and afterward at the sides, and the mechanism employed is as follows:

Power applied to the clutch-pulley 1, of ordinary construction, is transmitted by means of the shaft 2 and the pinion 3 to a gear, 4, mounted upon a second shaft, 5, which carries an eccentric, 6. This eccentric travels within the interior slot of a U-shaped arm, 7, mounted at one end upon a stationary axis, and provided at its other extremity with teeth which engage with a rack, 8, Figs. 4, 5, and 23. This rack carries a carriage provided with cam-faces 9 and guided in its upward motion by the guide-rods $8^a$. There are three of these cam-faces on two sides of the carriage and one each on the remaining two sides. Each cam-face as it rises bears against a friction-roller, 10, upon a cam-faced arm, 11, and each cam-faced arm in turn bears with its cam-face against a friction-roller, 17, upon the end of a lever, which is thereby thrown outward at the bottom around its hinged fulcrum 19 as the carriage rises.

It being desirable that the work done by the heel and toe slides upon the upper should be completed before the work of the side slides upon the upper begins, the inclination of the various cam-faces upon the carriage is regulated accordingly. All the slides being open to their farthest extent when the upward motion of the carriage begins, those of its cam-faces which bear against and operate the levers connected with the heel and toe slides act first. There are three of these levers to work the heel-slide and the same number to work the toe-slide. (See Fig. 24.) The three cams for a certain length of their face cause the three levers, during a certain portion of the upward movement of the carriage, to advance at an equal rate of speed; but the central cam of the three, $9^a$, for the rest of its length, being of quicker pitch than the others, a more rapid motion is thereby given to its lever $18^a$ during the second part of the upward motion of the carriage. The object of this construction is as follows:

It has been said that the operation of lasting the upper at the heel and toe is a compound one, which includes both the straining of the upper over the last in the direction of its length and also the sweeping of the upper radially inward over the heel and toe of the last with a curvilinear motion toward the center of the heel or toe. To accomplish this the heel-slides, and similarly the toe-slides, are mounted upon a box, 32, (see Figs. 12 to 16 and 18), which slides upon the upper edges of the well-frame 33. (See Figs. 11 and $11^a$.) Within this box 32 is placed a second sliding box, $32^a$, (see Fig. 17,) provided with ribs $32^b$, entering and guided by the slots $32^c$, on the under side of the top of the box 32. The two outer levers bear upon the box 32. The central lever bears upon the box $32^a$. So long as these three levers are operated at the same speed, the two frames advance together, and this advance produces simply the forward motion of the heel-slides, (or of the toe-slides, as the case may be,) and consequently, when these slides meet the upper, causes them to press or stretch it straight over the last in the direction of its longest axis. The heel and toe slides, however, in addition to this movement which they have in common with their supporting-boxes 32, are also so mounted (see Figs. 1, 3, and 12 to 14) as to be capable of a curvilinear motion around a center in the line and midway of their curved working faces, and by means of suitable gearing which connects these slides and the under box, $32^a$, any difference between the rate at which this box and the box 32, which carries the slides, advance will impart a rotary motion to the slides themselves upon the upper face of the box 32 by means of the intervening gearing. In this way the second motion whereby the upper is swept radially over and upon the heel or toe of the last in the direction of the center of the heel or toe is obtained; and it is obvious that if the forward motion of the two boxes 32 and $32^a$, as well as the advancing motion of the box $32^a$ over the box 32, is simultaneously kept up, the direct action of the slides upon the upper, as well as their radial or curvilinear or sweeping action, will be accomplished at the same time.

During the first part of the upward motion of the carriage 8 the three levers, and consequently the two boxes, have advanced simultaneously, and this continues until the heel-slides (or the toe-slides as well) have come in contact with the upper. At this point the increased pitch of the central cam on the carriage begins, and during the residue of the time that the cams are acting the box 32 is advancing and carrying the heel-slides (or the toe-slides) forward over the last in the direction of its central line, and continuously with this accelerated motion of the central lever is advancing the box $32^a$ over the box 32, and thereby rotating the heel-slides (or the toe-slides) and causing them to sweep the leather of the upper over and upon the heel (or the toe) of the last, as before indicated.

The motion of the side slides is a simple straight inward motion toward the central axis of the last; consequently but a single cam and lever is employed to operate each side slide. It is desired that the inward movement of the upper by the side slides toward the central line of the last should follow the lasting of the heel and toe. The cams, therefore, which operate the side slides have their relative pitch or bulge so constructed that the inward motion of the side slide and upper toward the central line of the last begins substantially when the lasting of the heel and toe ceases. It follows from the above that the effect of the upward motion of the cam-faced carriage and intermediate parts is to produce, first, the compound lasting motion desired to last the heel and toe, and then the simple lasting motion desired to last the sides of the upper. When both these things have been done, the upward motion of the carriage ceases to impart further motion to the lasting-slides; but it is continued for a further purpose, which will now be explained.

The upper being lasted or laid in proper position over and upon the last and inner sole, it is desired to retain it in that position temporarily until it may be finally secured. This temporary holding of the lasted upper in position is accomplished by the residue of the upward motion of the carriage, which is provided at its top with an adjustable bearing, $8^b$, mounted upon a screw, whereby it may be raised or lowered, as shown, which strikes against the last-supporting devices and carries them and the last upward until the edge of the lasted upper is firmly clamped between the last on the under side and the edges of the heel, toe, and side slides on the upper sides. The consequent slight upward motion of the gripping attachment is allowed for by the slotted formation of its arm, as illustrated at 62, Fig. 6. The machine is now stopped by releasing the clutch at the pulley 1, and the grip of the pinchers upon the upper relaxed. The simultaneous relaxing of the grip of the pinchers is accomplished by means of an arm, 81, (see Figs. 25 and 26,) disengaging the pawl 92 from the ratchet 93, and thereby freeing the coiled spring 94, connected with the screw-rod 76. This spring had been tightened by the revolution of the screw-rod in the act of closing the pinchers, and had been kept under tension by the pawl and ratchet. The pawl being now disengaged from the ratchet, the tension of the spring revolves the screw-rod 76 in the opposite direction and opens the pinchers. The gripping attachment may now be thrown back upon its supporting-arm and hung up upon the hook 64, to give room for the operation of the devices by which the permanent attachment of the lasted upper and inner sole is accomplished. For this purpose I prefer to employ a retaining-strip provided with a coating of fusible cement, and I have accordingly embodied in the machine an apparatus for applying this retaining-strip to secure the lasted upper and inner sole in place. The retaining-strip, having been laid upon the lasted upper and inner sole, is caused to adhere to them by the application of heat and pressure, and I will now describe that operation of the mechanism whereby these results are accomplished.

A second friction-pulley, 20, operates by means of its shaft 21 duplicate sets—one at either side of the machine (see Fig. 2)—of intervening gearing, 22 and 23, eccentrics 25, U-shaped slotted radial cams 26, and gearing 27, operating duplicate racks 30, which carry the bridge or yoke $82^a$. This bridge or yoke at its central portion, which is over the lasted work, is fitted to receive a suitable heating and pressing device of ordinary construction, and not shown, the bottom face of which is adapted to be brought down upon and press the retaining-strip. This corresponds nearly in outline with the inner sole, but is a little smaller in area, so as to be wholly concealed by the outer sole when it is afterward applied to the shoe. This heating and pressing device, having been put in place in the yoke, is brought down, together with the yoke, by means of the racks and connecting mechanism just described, (the pressing-surface having been previously heated to the temperature required to fuse the cement on the retaining-strip,) until it presses the retaining-strip against the inner sole and lasted upper, fusing the cement upon the retaining-strip and causing it and the inner sole and lasted upper to be quickly and permanently united. The continued action of the mechanism now raises the racks and lifts the bridge and the heating and pressing device to its upper position, whereupon this part of the mechanism is stopped and the heating and pressing device removed. The shoe is now lasted and secured, and it remains only to remove it from the machine. This is done by again setting in motion the pulley 1, which now acts through the same mechanism as before to cause the carriage and its connected parts to descend, and the levers which carry the heel and toe and side slides are now made to move those slides backward or away from the lasted shoe. To insure this return motion of the levers, the carriage 8 is also provided with four laterally-projecting racks, 12, (see Fig. 23,) each of which gears with a pinion, 13, whose shaft, supported by a standard, 14, carries a cam, 15, which bears against a pin, 16, on the lower end of the lever, and thereby forces its lower end inward, and consequently its outer end outward, as the carriage descends. It is obvious that the same racks, gears, and cams are operated when the carriage rises; but under these circumstances they exert no effect whatever upon the levers, as will readily be seen, their sole object being to drive the lower end of the levers inward when the carriage is descending. The carriage now having come to the end of its downward motion, the heel and toe and side slides are back to their original position—that is to say, as far removed as possible from the last and lasted shoe, which may now be removed from the machine by lifting it off the supports 44 and 43, the movement of the machine being at the same time stopped until a new last and upper have been set into it, to commence again the lasting operation.

The time required for performing all the operations of lasting and securing the work as I have hereinbefore described it, and by means of the devices herein described, I have found in practice to be less than one minute.

Having now described, generally, the construction and operation of the various parts of my improved machine, I will proceed to take up some of them more in detail.

The conjoined simultaneous operation of the two screw-rods 70, whereby the pinchers as a whole are carried up or down, is accomplished as follows: The upper ends of these two screw-rods pass through a connecting stay or bridge piece, 73, and are provided with nuts or caps, as shown. Upon each of these screw-rods, and at the upper part, is a pinion, 72. These pinions mesh with a gear, 74, which is connected with and rotated by a wheel, 75, both the wheel and the gear being mounted upon a common shaft, which is made hollow to allow the screw-rod 76 to pass through it.

I have already referred to the adjustment apart of the heel and toe support to accommodate different sizes of last. This adjustment and also the adjustment by which the throw of the heel and toe slides is regulated for the same purpose are obtained as follows:

The blocks which carry the toe-support and the two boxes which operate the toe-slides rest upon a well-frame, 33, which forms half of the well or chamber in which the last is placed. In the same manner, the heel-support and the boxes which operate the heel-slides are similarly within another corresponding half well-frame. These two half well-frames slide upon cross-braces, (see bolts and slots 48,) so that they may be separated by any desired distance, and the amount of their separation may be made to be just that required for any particular size of last within the capacity of the machine by means of two right and left screw-rods, 45, (see Fig. 3,) which, when turned simultaneously by means of the transverse rod 47 and the intervening gearing, 46, separate or draw together the two half well-frames to the proper distance for each size of last. Inasmuch as these half well-frames carry the heel and toe slides, it is obvious that the adjustment of the well-frames as described will likewise adjust the heel and toe slides at the same time. A further adjustment whereby the accurate bearing of the head of the lever, which occupies a constant position as compared with the adjustable position of the slides, is secured, so that it will always bear accurately against its frame in any adjustment, is obtained by means of the adjustable bearings 31ª, mounted upon screws, by turning which they can be brought forward or back, as may be required. The adjustment of the side slides to correspond to the different sizes of last is accomplished by employing various slides for the various sizes, their mode of adjustment with respect to their operating-levers being the same as in the case of the heel and toe slides. The adjustment apart of the heel and toe supports is made by adjusting the well-frames, to which the upper wedge-blocks are connected by pins and slots, as shown. The vertical adjustment is made by means of the screw-rod 40, as before explained. In order to permit the upward motion of these supports and the last to clamp the lasted upper temporarily against the under part of the slides, this screw-rod, where it passes through the walls of the well-frame, and also where it abuts at its end against the main frame of the machine, is left free to travel by means of the slots, as shown.

The construction of the devices for operating the pinchers in the gripping mechanism permits the adjustment of a single attachment of that character, so that it may be used in lasting two or even three sizes of work. When a greater range of adjustment is required, I provide several gripping attachments, each having its own range of sizes, and employing one or the other of them, as the work to be lasted may require.

Figure 18:
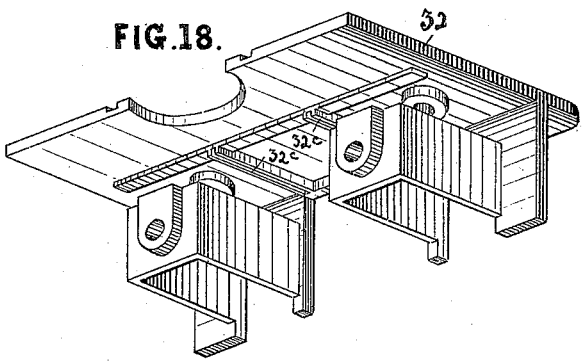

Figs. 17 and 18 illustrate in detail and on an enlarged scale the relative construction and mode of operation of the boxes 32 and 32ª, which give the compound motion to the heel-slides and toe-slides. The inner box, 32ª, which is carried by the central lever, is provided on its upper face with guide-ribs 32ᵇ, traveling in the slides 32ᶜ on the under side of the top of the outer box, 32. On the corners of the box 32ª are seen the racks 32ᵈ, which engage with pinions 35, Fig. 13, mounted on shafts, which extend through to the top surface of the box 32, and are there provided with the segmental gears 36, Fig. 12, which mesh with and operate the heel and toe slides 37, Fig. 1. These heel and toe slides move over the top face of the box 32 and between it and an overlying frame or yoke, 38.

The construction of the device for adjusting the position of the upper at the toe is illustrated in detail and upon an enlarged scale in Figs. 19 to 22. This device consists of a semi-circular concave lip, 50, mounted upon two rods, 50ª, which pass through slots in a vertical projection of the well-frame, and these rods are free to travel laterally through the slots, thereby compressing the interposed springs 50ᵇ. The front edge of the curved lip which acts against the upper being set at the proper place by adjusting the length of the rod 50ª by means of nuts, as shown, when the last is introduced and its toe placed upon the toe-support, it presses back the curved lip, which in turn, after the last is down in position, returns by the force of the spring 50ᵇ, and so guides or presses the edge of the upper slightly inward toward the center of the toe of the last. The curved lip remains in this position until just before the last is lifted to temporarily clamp the lasted upper in place, as already described, when the inner box, 32ª, in its forward movement, drives forward a rod, 52, which presses the lever 53 against the curved lip, and thereby forces it backward and out of the way of the upward motion of the last and lasted upper as they are brought up and clamped against the under side of the slides.

The additional feature in the construction of the inner screw-rods, 84, is shown in detail at Fig. 10, which is a cross-section of the central portion of the gripping attachment, taken at right angles to that of Fig. 9. By Fig. 10 it will be seen that the upper portion of the inner screw-rods, 84, or that part above the sleeve, is made in two parts, extending one by the other, each part provided at its end with a shoulder perforated to admit and allow the passage of the opposite part, but the two shoulders acting as abutments to compress the intermediate coiled spring surrounding the double or two-part rod at this part of its length. It will be observed that by this connection the working strain of the rod 84 tends to compress its tension-spring, and consequently the limited motion that the rod 84 can have will be reached when the spring is compressed together. This construction has an obvious advantage over any in which the rod is free not to contract but to expand or lengthen its supporting-spring, for with a spring so arranged no such simple and convenient limitation of the motion of the rod will be obtained.

I claim—

1. The combination, with the two screw-rods 70, which raise and lower the pinchers-carrying frame 79, (and the box 78,) of a single wheel, 75, and suitable intermediate gearing, 74 72, whereby the two rods may be made to turn uniformly, and so give uniform motion to the pinchers-carrying frame, substantially as set forth.

2. The combination of the screw-rods 70, the gears 72 and 74, and the wheel 75 with the cross frame or yoke 73, for supporting the upper ends of the rods, substantially as and for the purposes described.

3. The combination, with the screw-rod 76, of the wheel 75, provided with a centrally-perforated shaft, to admit the passage of the screw-rod 76 through it, substantially as described.

4. The duplex pincher-rod 84, herein described, consisting of two portions provided with end abutments inclosing a coiled spring, whereby the motion of either portion of the rod along the other portion tends to compress the coiled spring, substantially as described.

5. The adjustable pincher-rod 84, provided with the right and left threaded sleeves, as shown, for varying its length, substantially as described.

6. In a lasting-machine, the pinchers-opening device herein described, consisting of a helical spring, 94, one end of which is attached to and carried by a screw-rod, 76, whereby the turning of the said screw-rod to close the pinchers coils or compresses the said spring, and provided with a detachable detent, substantially as described, whereby the coiled spring may be released to reverse the motion of the screw-rod 76, and thereby open the pinchers, substantially as described.

7. The combination, with a gripper attachment, of a radial supporting-arm attached at one end to the gripper, and slotted to engage with a suitable standard, around which as a center the gripping mechanism may be swung to or from its place of working, all substantially as set forth.

8. The herein-described gripping attachment for lasting-machines, provided with an extensible jointed support, by means of which it may be thrown backward and upward or forward and downward, to bring it to or away from its place of working.

9. A gripping mechanism provided with a vertically-slotted supporting attachment, 62, of the character described, so as to permit the vertical uplifting of the gripping device, as and for the purposes set forth.

10. The combination, substantially as herein set forth, with the gripping attachment provided with the flexible support, of a suitable suspending device, 64, for holding the gripping attachment up and away from the lasted shoe when desired.

11. The combination, with a removable gripping attachment, of centering arms or projections 65 and suitable sockets, 65ª, to engage with said arms, and thus adjust the gripping attachment in place, substantially as shown.

12. The cam-faced carriage herein described, having a suitable rack-formed extension, 8, whereby upward and downward motion may be imparted to the carriage, all substantially as herein set forth.

13. In a lasting-machine, the herein-described means of operating the lasting and cementing devices, consisting of an eccentric working within an interiorly-slotted U-shaped pivoted arm provided with teeth adapted to engage with and raise or lower a rack, all substantially as herein described, and for the purposes set forth.

14. In a lasting-machine, the combination, with the shaft carrying a suitable driving-pulley, 1, of the gears 3 and 4, shaft 5, eccentric 6, pivoted radial vibrating slotted arm 7, and rack 8, carrying the cam-faced carriage, substantially as described.

15. The combination, with a shaft, 21, having a suitable driving-pulley, 20, of the gears 22 and 23, shaft 24, eccentrics 25, radial slotted vibrating arms 26, the gears 28 and 29, and the racks 30, attached to and carrying a beam, 82ª, adapted to receive and raise or lower a cement-fusing tool.

16. The means of obtaining the compound motion of the heel or toe slides herein described, consisting, essentially, of an advancing support, 32, carrying the said slides forward, and a second or subsidiary support, 32ª, having a motion past the first support, the heel and toe slides being carried by one support, and being geared to the other, whereby the differential motion of the two supports rotates the advancing slides.

17. The combination of the slotted well-frame 33, right and left screw-rod 40, and double wedge-blocks 41 42, carrying the heel and toe supports, all substantially as herein set forth, and for the purposes described.

18. In a lasting-machine, the combination, with the levers 18 18$^a$, for moving the heel, toe, and side slides, of the double adjustable bearings 31, connected with said slides, whereby is insured the accurate bearing of the head of the lever with the slides during their various adjustments for various sizes of lasts, all substantially as herein set forth.

19. In a lasting-machine, the combination, with the levers which operate the heel, toe, and side slides, of the retracting mechanism herein described, consisting of the gear-wheels 13, supported on standards 14, driven by the racks 12 on the carriage 8, and operating the cams 15, which engage with pin 16 on the lower ends of said levers to throw the said lower ends inward, as described.

20. In a lasting-machine, the yielding upper-leather guide herein described, consisting of the concave lip 50, with its adjustable rods 50$^a$ and interposed springs 50$^b$, substantially as and for the purpose hereinbefore set forth.

21. The combination, with the adjustable upper-leather guide herein described, of the lever 53 and rod 52, whereby the upper-leather guide is retracted at the close of the inward motion of the lasting-slides, for the purpose and in the manner herein set forth.

22. The combination, with the outer jaw, 82, of the pinchers of a gripping device for lasting-machines, of the rigid rod 83, attached to the outside, and the flexible or jointed rod 84, attached to the inside, of said jaw, substantially as herein set forth.

In testimony whereof I have hereunto subscribed my name this 18th day of December, A. D. 1883.

GILBERT HAWKES.

Witnesses:
GEORGE O. G. COALE,
JAMES F. BLIGH.